(12) United States Patent  (10) Patent No.: US 8,737,413 B2
Tanimoto  (45) Date of Patent: *May 27, 2014

(54) RELAY SERVER AND RELAY COMMUNICATION SYSTEM

(71) Applicant: Murata Machinery, Ltd., Kyoto (JP)

(72) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,020

(22) Filed: Nov. 2, 2012

(65) Prior Publication Data

US 2013/0136140 A1 May 30, 2013

(30) Foreign Application Priority Data

Nov. 30, 2011 (JP) .................................. 2011-263030

(51) Int. Cl.
*H04L 12/56* (2006.01)
(52) U.S. Cl.
USPC .......................................................... 370/409
(58) Field of Classification Search
CPC ........................ H04L 12/4625; H04L 12/4641
USPC .................... 370/392, 409; 709/238
See application file for complete search history.

(56) References Cited

U.S. PATENT DOCUMENTS 7,379,458 B2 * 5/2008 Inoue et al. .................. 370/392
2008/0201486 A1 8/2008 Hsu et al.
2012/0057602 A1 3/2012 Tanimoto
2013/0136130 A1 * 5/2013 Tanimoto ..................... 370/392
2013/0238813 A1 * 9/2013 Tanimoto ..................... 709/238

FOREIGN PATENT DOCUMENTS

| EP | 1 441 483 A2 | 7/2004 |
| EP | 1441483 | * 7/2004 | ............. H04L 12/66 |
| JP | 2009-225258 A | 10/2009 |
| JP | 2010-268312 A | 11/2010 |

OTHER PUBLICATIONS

Official Communication issued in corresponding European Patent Application No. 12193395.6, mailed on Mar. 15, 2013.

* cited by examiner

*Primary Examiner* — Asad Nawaz
*Assistant Examiner* — Parth Patel
(74) *Attorney, Agent, or Firm* — Keating & Bennett, LLP

(57) ABSTRACT

A first relay server stores a first routing target address and a second routing target address. The first relay server stores a first routing target address and a virtual address allocated to the first routing target address while being correlated with each other. The first relay server allocates the virtual address to the first routing target address. The first relay server sets whether communication is conducted using the virtual address or the first routing target address with respect to each second relay server. The first relay server transmits the virtual address allocated to the first routing target address to the second relay server, and receives the second routing target address from the second relay server, so as to establish a routing session with the second relay server. The first relay server performs routing control based on the exchanged routing target address.

3 Claims, 14 Drawing Sheets

FIG. 3

```
<?xml version="1.0" encoding="UTF-8" ?>
-<root>
    -<group id="group-a@relaysystem.net"
        lastmod="20090402133100" name="GROUP A">         }511
        <site id="server1@relaysystem.net" rel="allow"/>
        <site id="server2@relaysystem.net" rel="allow"/> }512
        <site id="server3@relaysystem.net" rel="allow"/>
    </group>
</root>
```

FIG. 4

```
<?xml version="1.0" encoding="UTF-8" ?>
-<root>
    -<site id="server1@relaysystem.net"
        name="RELAY SERVER 1" stat="active">                                }521
        -<node group="group-a@relaysystem.net"
            id="client13@server1.net"
            name="CLIENT 13" site="server1@relaysystem.net"/>               }522
    </site>
    -<site id="server2@relaysystem.net"
        name="RELAY SERVER 2" stat="active">                                }521
        -<node group="group-a@relaysystem.net"
            id="client22@server2.net"
            name="CLIENT 22" site="server2@relaysystem.net"/>               }522
    </site>
    -<site id="server3@relaysystem.net"
        name="RELAY SERVER 3" stat="active">                                }521
        -<node group="group-a@relaysystem.net"
            id="client34@server3.net"
            name="CLIENT 34" site="server3@relaysystem.net"/>               }522
    </site>
</root>
```

FIG. 5A

```
<?xml version="1.0" encoding="UTF-8" ?>
-<root>
  -<node addr="200.1.40.30"
      group="group-a@relaysystem.net"
      id="client13@server1.net"
      name="CLIENT 13" pass="abc" port="5070">
  </node>
</root>
```

FIG. 5B

```
<?xml version="1.0" encoding="UTF-8" ?>
-<root>
  -<node addr="172.158.0.20"
      group="group-a@relaysystem.net"
      id="client22@server2.net"
      name="CLIENT 22" pass="abc" port="5070">
  </node>
</root>
```

FIG. 5C

```
<?xml version="1.0" encoding="UTF-8" ?>
-<root>
  -<node addr="192.168.0.40"
      group="group-a@relaysystem.net"
      id="client34@server3.net"
      name="CLIENT 34" pass="abc" port="5070">
  </node>
</root>
```

FIG. 6

```
<?xml version="1.0" encoding="UTF-8"?>
-<root>
   -<vnet group="group-a@relaysystem.net"           ⎫
      id="vpn-group-1@relaysystem.net"              ⎬ 541
      lastmod="20090410162500" name="VPN-GROUP 1">  ⎭
      <rp id="server1@relaysystem.net"/>            ⎫ 542
      <rp id="server3@relaysystem.net"/>            ⎭
      <ssn sp="server3@relaysystem.net"             ⎫ 543
        ep="server1@relaysystem.net"/>              ⎭
   </vnet>
</root>
```

FIG. 7A

| ADDRESS FILTER INFORMATION ||
|---|---|
| ROUTING TARGET ADDRESS | NAME |
| 200.1.40.10 | OPERATING PC 11 |
| 200.1.40.20 | OPERATING PC 12 |

FIG. 7B

| ADDRESS FILTER INFORMATION ||
|---|---|
| ROUTING TARGET ADDRESS | NAME |
| 172.158.0.10 | OPERATING PC 21 |

FIG. 7C

| ADDRESS FILTER INFORMATION ||
|---|---|
| ROUTING TARGET ADDRESS | NAME |
| 192.168.0.10 | TARGET TERMINAL 31 |
| 192.168.0.20 | TARGET TERMINAL 32 |
| 192.168.0.30 | TARGET TERMINAL 33 |

FIG. 8A

STORAGE CONTENT OF RELAY SERVER 1

| TERMINAL ID OF ROUTING DEVICE | ADDRESS FILTER INFORMATION | |
| --- | --- | --- |
| | ROUTING TARGET ADDRESS | NAME |
| server1@relaysystem.net | 200.1.40.10 | OPERATING PC 11 |
| | 200.1.40.20 | OPERATING PC 12 |
| server3@relaysystem.net | 150.100.0.82 | TARGET TERMINAL 31 |
| | 180.50.10.55 | TARGET TERMINAL 32 |
| | 150.100.0.35 | TARGET TERMINAL 33 |

FIG. 8B

STORAGE CONTENT OF RELAY SERVER 3

| TERMINAL ID OF ROUTING DEVICE | ADDRESS FILTER INFORMATION | | VIRTUAL ADDRESS |
| --- | --- | --- | --- |
| | ROUTING TARGET ADDRESS | NAME | |
| server1@relaysystem.net | 200.1.40.10 | OPERATING PC 11 | — |
| | 200.1.40.20 | OPERATING PC 12 | — |
| server3@relaysystem.net | 192.168.0.10 | TARGET TERMINAL 31 | 150.100.0.82 |
| | 192.168.0.20 | TARGET TERMINAL 32 | 180.50.10.55 |
| | 192.168.0.30 | TARGET TERMINAL 33 | 150.100.0.35 |

| VIRTUAL ADDRESS REGISTRATION INFORMATION |
|---|
| 150.100.0.0/24 |
| 180.50.10.0/24 |

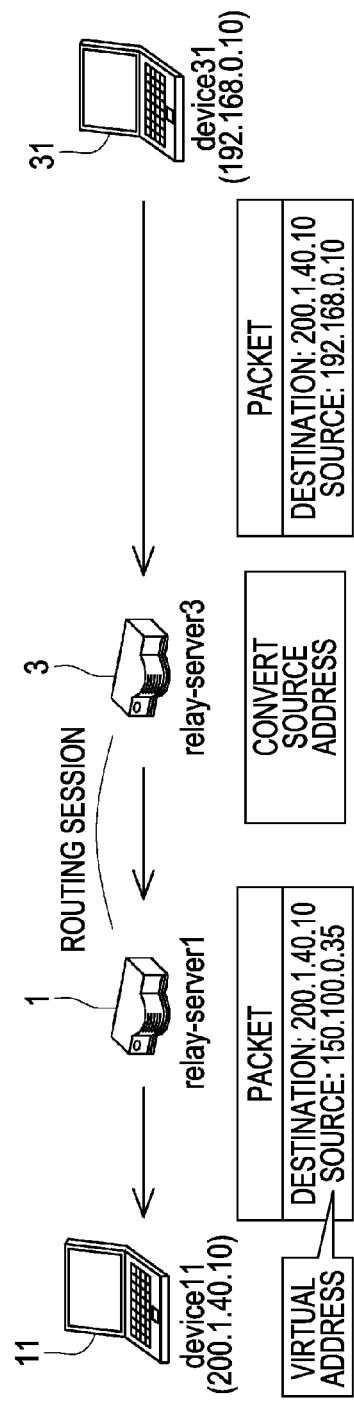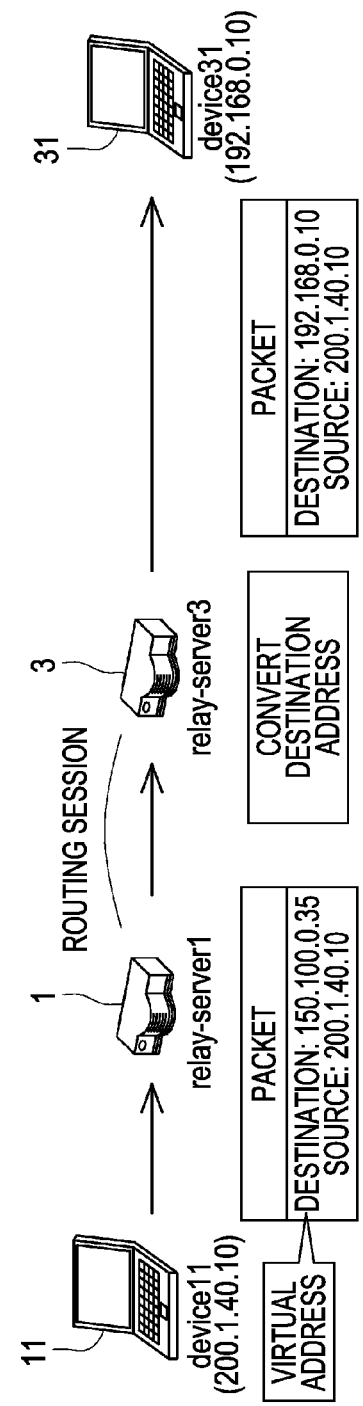

FIG. 17

| VIRTUAL ADDRESS SETTING INFORMATION | |
|---|---|
| NAME | ADDRESS TRANSMITTED IN EXCHANGING ADDRESS FILTER INFORMATION |
| RELAY SERVER 1 | VIRTUAL ADDRESS |
| RELAY SERVER 2 | ACTUAL ADDRESS |

RELAY SERVER AND RELAY COMMUNICATION SYSTEM

CROSS-REFERENCE TO RELATED APPLICATIONS

This application claims priority under 35 U.S.C. 119 to Japanese Patent Application No. 2011-263030 filed on Nov. 30, 2011, which application is hereby incorporated by reference in its entirety.

BACKGROUND OF THE INVENTION

1. Field of the Invention

The present invention mainly relates to a relay server that enables communication between devices connected to different LANs (Local Area Networks).

2. Description of the Related Art

Conventionally, there is a well known communication technology called a Virtual Private Network (VPN) in which LANs located in physically distant positions conduct communication with each other. In an example illustrated in a well-known document, for example, a relay server, a communication terminal, and the like are connected to each of a plurality of LANs installed at locations that are physically distant from each other. Using the VPN, the communication terminal can transmit a packet to the communication terminal connected to another LAN. Specifically, the packet is first transmitted from the communication terminal to the relay server in the same LAN. The relay server transmits via the Internet the packet to the relay server in the same LAN as the destination communication terminal. The relay server that receives the packet then transmits the packet to the destination communication terminal.

By using the VPN, another remotely-located LAN can be used as if the remotely-located LAN is a directly-connected network.

In this type of system, terminals conduct communication with each other using IP addresses (private IP addresses) of the terminals connected to the LAN. Accordingly, in the case where the communication is conducted using the VPN, it is necessary to transmit the IP address set to initiating LAN to the LAN of the other side.

From this viewpoint, for example, in the case where the VPN is constructed in the same company, a problem hardly occurs even if the other side learns the IP address. However, in the case where the VPN is constructed in different companies, from the viewpoint of security, it is undesirable that the other side learns the IP address. Accordingly, there is a need for a configuration in which the VPN can be operated such that the IP address provided to a device in the LAN cannot be learned by the other LAN side.

SUMMARY OF THE INVENTION

Preferred embodiments of the present invention provide a relay server that constructs a relay communication system that conducts relay communication without informing the actual address to the other side.

According to a first preferred embodiment of the present invention, a relay server includes an address filter information storage unit, a virtual address allocation relationship storage unit, a controller, and a virtual address setting information storage unit. The address filter information storage unit stores a first routing target address and a second routing target address, the first routing target address being an address of a first routing target device, to which a packet is transferred by the relay server, located in a first LAN, the second routing target address being an address of a second routing target device to which a second relay server located in a second LAN transfers a packet. The virtual address allocation relationship storage unit stores the first routing target address and a virtual address allocated to the first routing target address while being correlated with each other. The virtual address setting information storage unit stores with respect to each second relay server whether communication is conducted using the virtual address or the first routing target address. The controller is programmed to allocate the virtual address to the first routing target address and store an allocation relationship between the virtual address and the first routing target address in the virtual address allocation relationship storage unit. The controller is programmed to set with respect to each second relay server whether the communication is conducted using the virtual address or the first routing target address. The controller is programmed to transmit the virtual address allocated to the first routing target address to the second relay server and receive the second routing target address from the second relay server, to establish a routing session with the second relay server. The controller is programmed to refer to the virtual address allocation relationship storage unit when receiving a packet having a destination of the virtual address from the routing session and convert the destination address of the packet into the first routing target address corresponding to the virtual address, to transfer the packet to the first routing target device of the destination. The controller refers to the virtual address allocation relationship storage unit when receiving a packet having a destination of the second routing target device from the first routing target device and convert a source address of the packet into the virtual address allocated to the first routing target address, to transfer the packet to the routing session.

The controller is programmed to convert the address as described above, so that the first routing target device can conduct communication with the second routing target device without notifying its address to the other side. Accordingly, the relay communication can be conducted while the security is ensured. Moreover, when viewed from the second relay server and the second routing target device, whether the address indicating the first routing target device is the actual address or the virtual address is concealed, so that the security can also be improved from this point. A user who uses a certain relay server can determine the address used with respect to each relay server in consideration of a relationship with a user of another relay server. Accordingly, the relay communication system that flexibly deals with various situations can be constructed.

In the above relay server, the controller is preferably is programmed to allocate a randomly-determined virtual address to the first routing target address.

Accordingly, the first routing target address is prevented from being determined from the virtual address, so that the security can be further improved.

According to a second preferred embodiment of the present invention, the following configuration is provided in a relay communication system including a first relay server and a second relay server. That is, the first relay server located in a first LAN includes an address filter information storage unit, a virtual address allocation relationship storage unit, a controller, and a virtual address setting information storage unit. The address filter information storage unit stores a first routing target address and a second routing target address, the first routing target address being an address of a first routing target device to which the first relay server transfers a packet, the second routing target address being an address of a second routing target device to which the second relay server located in a second LAN transfers the packet. The virtual address allocation relationship storage unit stores the first routing target address and a virtual address allocated to the first routing target address while correlated with each other. The virtual address setting information storage unit stores with respect to each second relay server whether communication is conducted using the virtual address or the first routing target address. The controller is programmed to allocate the virtual address to the first routing target address, to store an allocation relationship between the virtual address and the first routing target address in the virtual address allocation relationship storage unit. The controller is programmed to set with respect to each second relay server whether the communication is conducted using the virtual address or the first routing target address. The controller is programmed to transmit the virtual address allocated to the first routing target address to the second relay server and receive the second routing target address from the second relay server, to establish a routing session with the second relay server. The controller is programmed to refer to the virtual address allocation relationship storage unit when receiving a packet having a destination of the virtual address from the routing session and convert the destination address of the packet into the first routing target address corresponding to the virtual address, to transfer the packet to the first routing target device of the destination. The controller is programmed to refer to the virtual address allocation relationship storage unit when receiving a packet having a destination of the second routing target device from the first routing target device and convert a source address of the packet into the virtual address allocated to the first routing target address, to transfer the packet to the routing session.

The controller is programmed to convert the address as described above, so that the first routing target device can conduct communication with second routing target device without notifying its address to the other side. Accordingly, the relay communication can be conducted while the security is ensured. Moreover, when viewed from the second relay server and the second routing target device, whether the address indicating the first routing target device is the actual address or the virtual address is concealed, so that the security can also be improved from this point. A user who uses a certain relay server can determine the address used with respect to each relay server in consideration of a relationship with a user of another relay server. Accordingly, the relay communication system that flexibly deals with various situations can be constructed.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a view illustrating a content of relay group information.

FIG. 4 is a view illustrating a content of relay server information.

FIGS. 5A-5C are views illustrating a content of client terminal information.

FIG. 6 is a view illustrating a content of VPN group information.

FIGS. 7A-7C are views illustrating a content of address filter information previously registered in each relay server.

FIGS. 8A and 8B are views illustrating contents stored in relay servers 1 and 3 after VPN construction.

FIGS. 16A and 16B are explanatory views illustrating routing control in which a virtual address is used.

FIG. 17 is a view illustrating a content of virtual address management information (setting information).

DETAILED DESCRIPTION OF THE PREFERRED EMBODIMENTS

Figure 1:
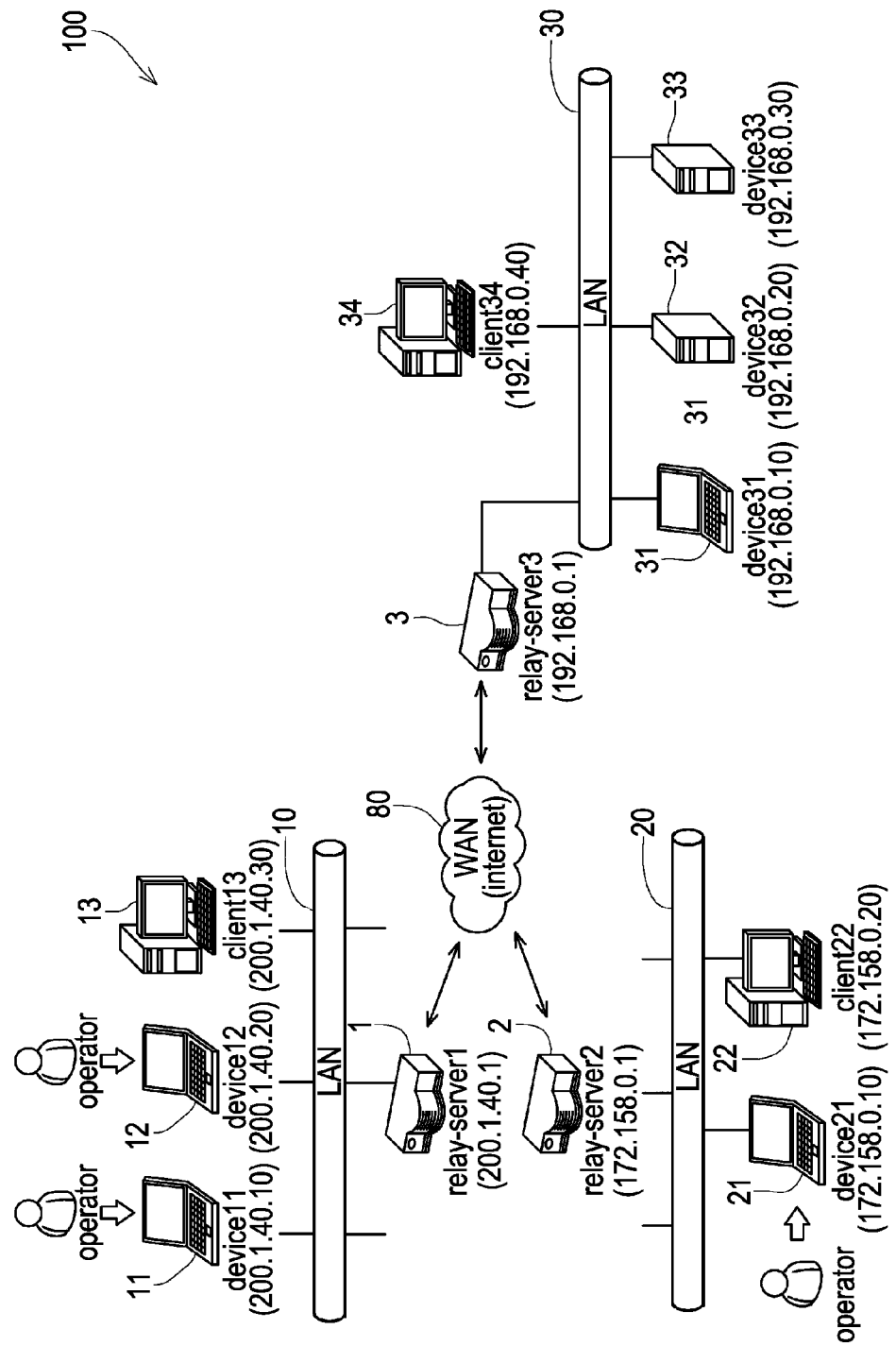
FIG. 1 is an explanatory view illustrating an entire configuration of a relay communication system according to a preferred embodiment of the present invention.

Hereinafter, preferred embodiments of the present invention will be described with reference to the drawings. An outline of a relay communication system 100 will be described with reference to FIG. 1. FIG. 1 is an explanatory view illustrating an entire configuration of the relay communication system 100 according to the present preferred embodiment.

As illustrated in FIG. 1, the relay communication system 100 preferably includes a plurality of LANs 10, 20, and 30 connected to a Wide Area Network (WAN) 80. Each of the LANs 10, 20, and 30 preferably is a relatively small network constructed at a restricted site, for example. The LANs 10, 20, and 30 are disposed in positions that are physically distant from one another. In the present preferred embodiment, the Internet is preferably used as the WAN 80, for example.

Each LAN will specifically be described below. As illustrated in FIG. 1, a relay server (second relay server) 1, operating PCs 11 and 12 serving as the second routing target device, and a client terminal 13, are connected to the LAN (second LAN) 10. A relay server 2, an operating PC 21, and a client terminal 22 are connected to the LAN 20. A relay server (first relay server) 3, target terminals 31, 32, and 33 serving as the first routing target device, and a client terminal 34 are connected to the LAN (first LAN) 30.

Because each of the relay servers 1, 2, and 3 is connected to not only the LANs 10, 20, and 30 but also the WAN 80, each of the relay servers 1, 2, and 3 can conduct communication with not only a device connected to the same LAN but also the relay servers disposed in other LANs. For example, the operating PCs 11, 12, and 21 preferably are personal computers operated by an operator. For example, the target terminals 31, 32, and 33 preferably are personal computers, file servers, and the like. It is conceivable that the operator operates the operating PC 11 to make a request of predetermined data to the target terminal 31 and the like and that the operator operates the operating PC 11 to update a storage content of the target terminal 31. For example, the client terminals 13, 22, and 34 are preferably constructed by personal computers, for example. The client terminals 13, 22, and 34 can conduct communication with one another through the relay servers 1, 2, and 3 to which the client terminals 13, 22, and 34 belong.

Figure 2:
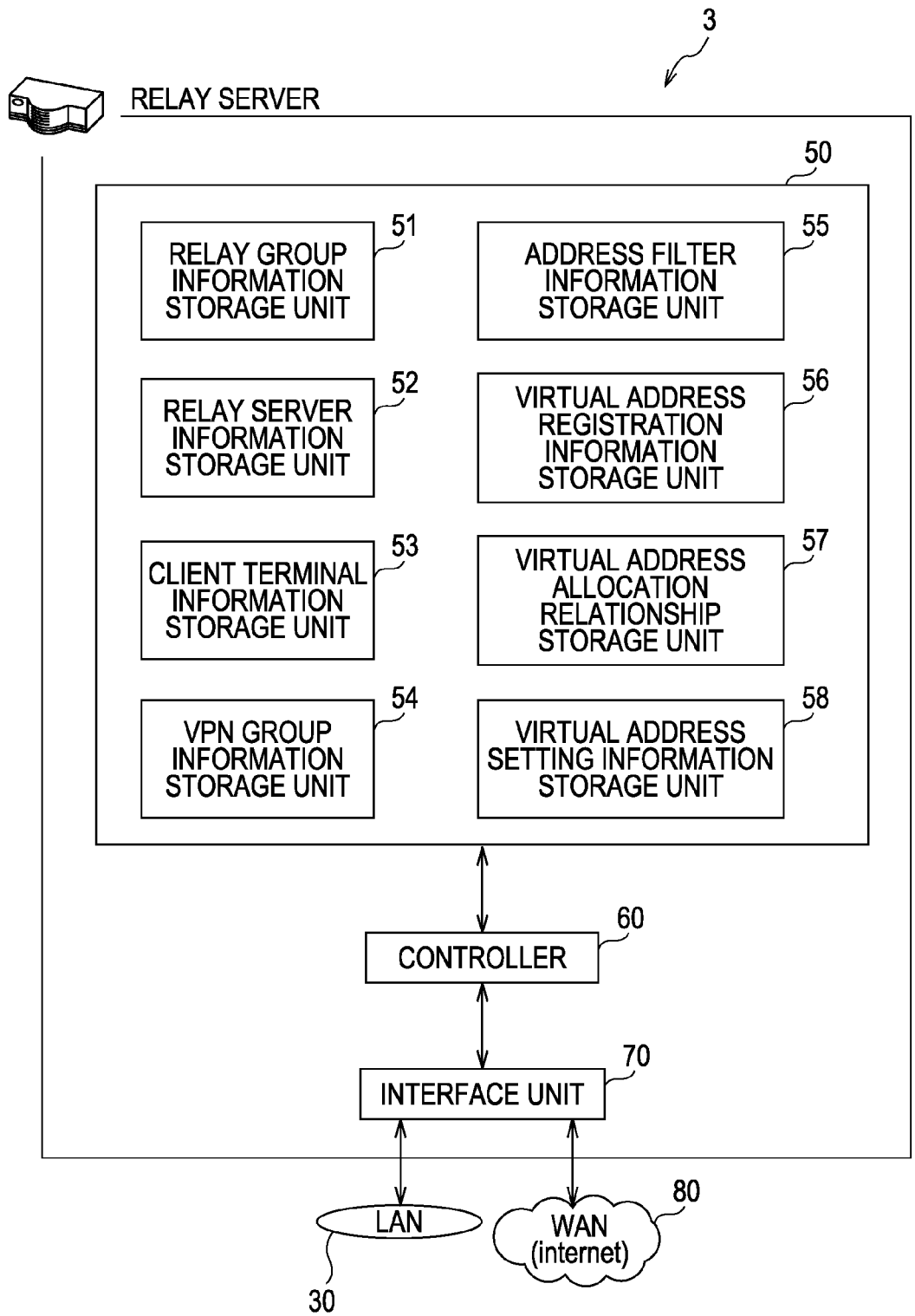
FIG. 2 is a functional block diagram of a relay server.

Detailed configurations of the relay servers 1, 2, and 3 will be described below with reference to FIG. 2. FIG. 2 is a functional block diagram of the relay server 3. Because the relay server 3 preferably has substantially the same configuration as the relay servers 1 and 2, the relay server 3 will mainly be described below.

As illustrated in FIG. 2, the relay server 3 includes a storage unit 50, a controller 60, and an interface unit 70.

The interface unit 70 conducts communication with the terminal in the LAN 10. The interface unit 70 also conducts communication with the WAN 80. The interface unit 70 performs proper processing to a packet received from the LAN 30 or the WAN 80, and outputs the packet to the controller 60.

For example, the controller 60 preferably is a CPU having control and calculation functions. The controller 60 can perform various types of processing using a program read from the storage unit 50. The controller 60 can control various types of communication pursuant to protocols, such as TCP/IP, UDP, and SIP, for example. Specifically, the controller 60 determines a destination of the received packet based on information indicated by the packet and information stored in the storage unit 50, and transmits the packet to the determined destination. The controller 60 can update a storage content of the storage unit 50 based on information received from another terminal.

For example, the storage unit 50 preferably includes a hard disk or a nonvolatile RAM, and various types of data can be stored in the storage unit 50. The storage unit 50 preferably includes a relay group information storage unit 51, a relay server information storage unit 52, a client terminal information storage unit 53, a VPN group information storage unit 54, an address filter information storage unit 55, a virtual address registration information storage unit 56, a virtual address allocation relationship storage unit 57, and a virtual address setting information storage unit 58. Because the relay servers 1 and 2 do not conduct communication in which a virtual address is used, each of the relay servers 1 and 2 does not include the virtual address registration information storage unit 56 and the virtual address allocation relationship storage unit 57. The storage content of the storage unit 50 will be described below with reference to FIGS. 3 to 9. FIGS. 3 to 9 are views illustrating the storage contents of the storage unit 50 of the relay server 3.

Relay group information indicates a relay group and a relay server constituting the relay group, and is stored in the relay group information storage unit 51.

As illustrated in FIG. 3, a group tag that is a parent element and a site tag that is a child element of the group tag are described in the relay group information. Group information 511 on the relay group is described in the group tag. The group information 511 includes identification information ("id") on the relay group, a last update time ("lastmod"), and a name ("name") of the relay group. Group configuration information 512 on the relay server constituting the relay group is described in the site tag. Identification information ("id") on the relay server is described in the group configuration information 512. The relay group can additionally be produced. In this case, unique identification information different from that of other relay groups is provided to the new relay group. Therefore, a setting such that data is exchanged only within a specific relay group can be performed.

The relay group information is shared by the relay servers 1, 2, and 3 constituting the relay group. In the case where a certain relay server performs processing to change the relay group, that the relay group is changed is transmitted to other relay servers, and the relay group information is updated. In this manner, the relay group information is dynamically shared.

The relay server information storage unit 52 stores relay server information indicating outlines of a relay server that conducts relay communication and the client terminal belonging to the relay server.

A site tag, which is a parent element and described in every relay server, and a node tag that is a child element of the site tag are described in the relay server information in FIG. 4. Server information 521 on the relay server 1 is described in the site tag. The server information 521 includes identification information ("id") on the relay server, a name ("name") of the relay server, and start-up information ("stat"). The case where the content of "stat" is "active" indicates that the relay server is logged into the relay communication system 100, and the case where the content of "stat" is blank indicates that the relay server is logged off. Belonging information 522 indicating the client terminal belonging to the relay server is described in the node tag that is the child element of the site tag. The belonging information 522 includes a name ("group") of the relay group to which the relay server belongs, identification information ("id") on the client terminal, a name ("name") of the client terminal, and identification information ("site") on the relay server to which the client terminal belongs. The identification information "site" is blank when the client terminal is not logged in the relay communication system 100.

The relay group conducts communication based on the relay group information and the relay server information in the following manner. For example, in the case where the client terminal 13 transmits the packet to the client terminal 22, the client terminal 13 transmits the packet to the relay server 1, which is the relay server to which the client terminal 13 is connected. The relay server, with which the packet can be exchanged, can be recognized based on the relay group information, and the identification information on the client terminal belonging to the relay server and enable/disable of the connection can be recognized based on the relay server information. Based on the pieces of information, the relay server 1 transfers the packet to the relay server 2, which is the relay server to which the client terminal 22 is connected. The relay server 2 that receives the packet transfers the packet to the client terminal 22. In this manner, the client terminals 13 and 22 can conduct relay communication with each other.

Similarly to the relay group information, the relay server information is also shared by the relay servers 1, 2, and 3 constituting the relay group. In the case where a certain relay server performs the processing of changing the relay server information, the fact that the relay server information is changed is transmitted to other relay servers, and the relay server information is updated. Accordingly, the relay server information is dynamically shared.

The client terminal information storage unit 53 stores client terminal information that is the detailed information on the client terminal. The relay servers 1, 2, and 3 preferably store only client terminal information on the client terminal belonging to each of the respective relay servers 1, 2, and 3. Because the client terminal 34 belongs to the relay server 3, only the client terminal information on the client terminal 34 is stored in the client terminal information storage unit 53 of the relay server 3.

FIG. 5C illustrates the client terminal information stored in the client terminal information storage unit 53 of the relay server 3. Similarly, FIG. 5A illustrates the client terminal information stored in the relay server 1, and FIG. 5B illustrates client terminal information stored in the relay server 2.

The node tag is described in the client terminal information illustrated in FIGS. 5A-5C. A private IP address ("addr") of the client terminal, a name ("group") of the relay group to which the relay server belongs, the identification information ("id"), the name ("name"), a password ("pass") used to log into the relay server, and port information ("port") are described in the node tag.

The VPN group information storage unit 54 stores VPN group information. The VPN group information is information on a VPN group including the relay servers constituting the relay group and a device (hereinafter referred to as a routing device) that is selected as a routing point from the client terminals. The routing devices belonging to the same VPN group establish a routing session, which allows the communication using the VPN to be started.

A vnet tag is described in the VPN group information illustrated in FIG. 6. VPN group basic information 541, routing point information 542, and routing session information 543 are described in the vnet tag. The name ("group") of the relay group to which the VPN group belongs, identification information ("id") on the VPN group, the last update time ("lastmod"), and a name ("name") of the VPN group are described in the VPN group basic information 541. The identification information on the routing device that performs routing during the communication between the VPN groups is described in the routing point information 542. In the example of FIG. 6, the relay server 1 and the relay server 3 are described as the routing device. The routing devices connected to each other in the VPN group are described in the routing session information 543. In the routing session information 543, the routing devices are defined by being divided into a side ("sp (start point)") that initially performs communication control and a side "ep (endpoint)" that receives the communication control in routing session establishing processing of establishing the VPN to start the communication in the VPN group. In the following description, the routing device on the side that initially performs the communication control in order to establish the routing session may be referred to as a "starting point," and the routing device that receives the communication control may be referred to as an "ending point".

It can be seen from the VPN group information illustrated in FIG. 6 that the VPN group (VPN-GROUP-1) includes the relay server 1 and the relay server 3. It can be also seen that, at the start of the VPN group, the relay server 3 performs the communication control to the relay server 1 in order to establish the routing session.

Similarly to the relay server information and the relay group information, the VPN group information is shared by the relay servers 1 and 3 belonging to the same VPN group. In the case where a certain relay server performs processing to change the VPN group information, the fact that the VPN group information is changed is transmitted to other relay servers belonging to the same VPN group, and the VPN group information is updated. Accordingly, the VPN group information is dynamically shared. A process of producing the VPN group will be described later.

The address filter information storage unit 55 stores address filter information, which is used when performing routing control using the VPN. Before the VPN is constructed, the address filter information storage unit 55 stores information (address filter information on the relay server 3) indicating a device (routing target device) to which the relay server 3 can directly transmit the packet. The address filter information includes an address (routing target address) of the routing target device and a name of the routing target device.

FIG. 7C illustrates an example of the address filter information previously registered in the relay server 3. This example describes that the device to which the relay server 3 can directly transmit the packet is the target terminals 31, 32, and 33. FIG. 7A illustrates the address filter information previously registered in the relay server 1, and FIG. 7B illustrates the address filter information previously registered in the relay server 2. Hereinafter, the routing target address (addresses of the target terminal 31, 32, and 33) included in the address filter information on the relay server 3 may be referred to as a first routing target address, and the routing target address (addresses of the operating PCs 11 and 12) included in the address filter information on the relay server 1 may be referred to as a second routing target address.

Figures 9, 10:
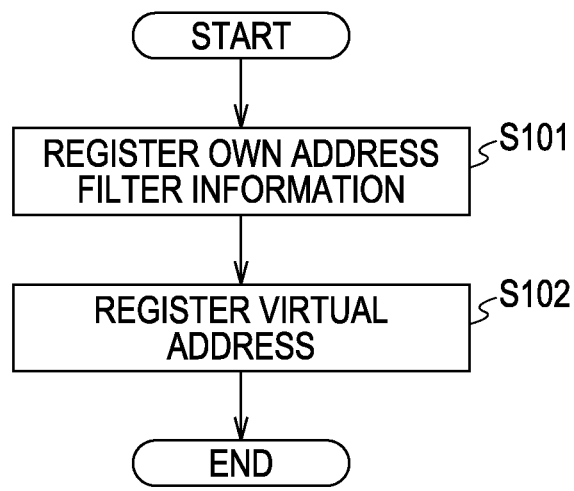
FIG. 9 is a view illustrating a content of virtual address registration information.
FIG. 10 is a flowchart illustrating a setting previously performed to the relay server.

As illustrated in FIG. 9, an address (an address that is neither allocated to nor reserved for the device in the LAN 30) that does not overlap in at least the LAN 30 is previously registered as the virtual address in the virtual address registration information storage unit 56 of the relay server 3. The virtual address is allocated to the first routing target address in a predetermined timing (for example, timing in which the communication with another relay server is started). The virtual address allocation relationship storage unit 57 stores a correspondence relationship (allocation relationship) between the first routing target address and the virtual address. As illustrated in FIG. 17, the virtual address setting information storage unit 58 stores with respect to each relay server whether the communication is conducted using the virtual address or the first routing target address. At least three relay servers may be set whether the communication is conducted using the virtual address or the first routing target address.

A difference between the communication in which the virtual address is not used and the communication in which the virtual address is used will briefly be described below. In the case where virtual address is not used, the relay servers exchange the routing target addresses (the actual addresses) with each other when the routing session is established. Therefore, the relay server can conduct communication using the routing target address of the other side of the communication. However, from the viewpoint of security, it is undesirable that the routing target address is learned.

On the other hand, in the communication in which the virtual address is used, the virtual address is transmitted instead of the routing target address in transmitting the address filter information. In the relay communication system 100, the routing target devices can conduct communication with each other using the virtual address (detailed processing is described later). Accordingly, in the present preferred embodiment, the relay communication can be conducted while the security is ensured.

Figure 11:
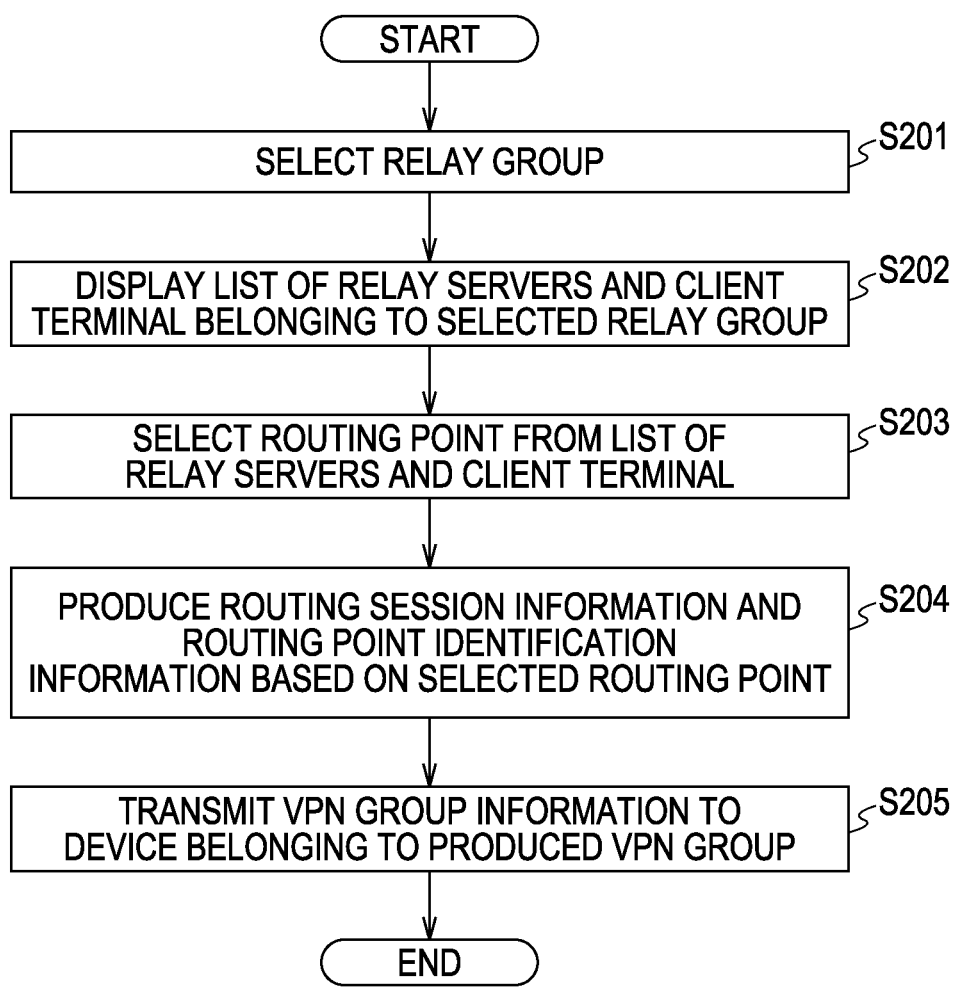
FIG. 11 is a flowchart illustrating processing of producing a VPN group.

A preparation for the communication in which the VPN is used will be described below. Firstly, a setting previously performed to the relay server will be described with reference to FIG. 10, and then a flow of processing of producing the VPN group will be described with reference to FIG. 11. FIG. 10 is a flowchart illustrating the setting previously performed to the relay server. FIG. 11 is a flowchart illustrating the processing of producing the VPN group.

The address filter information on the relay server 3 is registered (S101) as the setting previously performed to the relay server 3. This registration is performed by a user who uses the relay communication system 100 inputting the address (the first routing target address) and the name of the device assigned as the routing target device by a predetermined method. In this case, it is assumed that the user inputs the addresses and the names of the target terminals 31, 32, and 33. The address filter information registered herein is stored in the address filter information storage unit 55.

Next, in the case where the communication is conducted using the virtual address, the user registers the address, which does not overlap in at least the LAN 30, as the virtual address (S102). The virtual address registered herein is stored in the virtual address registration information storage unit 56. In addition to the registration of the virtual address, the user can also set whether the communication in which the virtual address is used is permitted (whether the allocation of the virtual address is permitted). In the case where the user wishes that the actual addresses of the target terminals 31, 32, and 33 are not to be learned, the user registers the permission of the allocation of the virtual address in the relay server 3. Additionally, the user can set whether the communication is conducted using the virtual address or the actual addresses (the first routing target addresses) of the target terminals 31, 32, and 33 in each relay server. Accordingly, for example, the relay server 3 can conduct communication with the relay server 1 using the virtual addresses allocated to the target terminals 31, 32, and 33, and conduct communication with the relay server 2 using the actual addresses of the target terminals 31, 32, and 33. The relay server 3 may conduct communication with three or more relay servers.

The flow of the processing of producing the VPN group will be described below. First, the user can display a setting screen of the VPN group by operating the client terminals 13, 22, and 34. Herein, the case where the setting is performed using the client terminal 34 will be described. A plurality of relay groups to which the client terminal 34 belongs are displayed on the setting screen displayed on the client terminal 34. From the plurality of relay groups, the user selects the relay group in which the VPN group should be constructed (S201).

When the relay group is selected, a list of pieces of identification information on the relay servers and the client terminals, which belong to the selected relay group and can act as the routing point, are displayed on the screen of the client terminal 34 (S202). The user selects the relay server and the client terminal, which act as the routing point, in the VPN group to be constructed (S203). In this description, it is assumed that the user selects the relay server 1 and the relay server 3.

The identification information on the routing point and the routing session information on the routing point are produced based on the identification information on the selected relay server (S204). The identification information on the VPN group is added to the pieces of information to produce the VPN group information illustrated in FIG. 6. The client terminal 34 transmits the VPN group information to the relay servers 1 and 3 belonging to the same VPN group (S205). Each of the relay servers 1 and 3 stores the received VPN group information in the VPN group information storage unit 54. In this manner, the processing of constructing the VPN group is completed.

Figure 12:
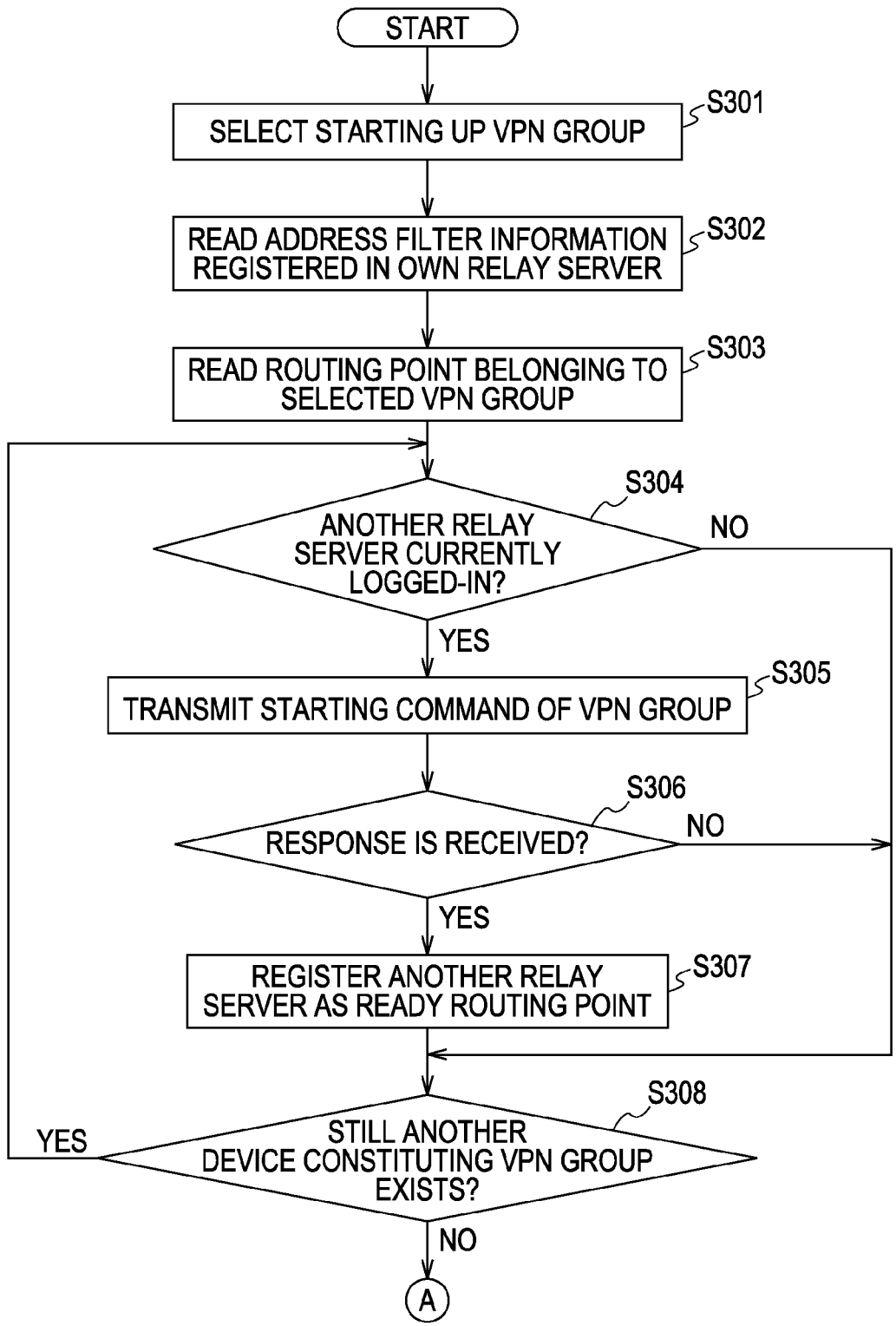
FIG. 12 is a flowchart illustrating processing of constructing a VPN.
Figure 13:
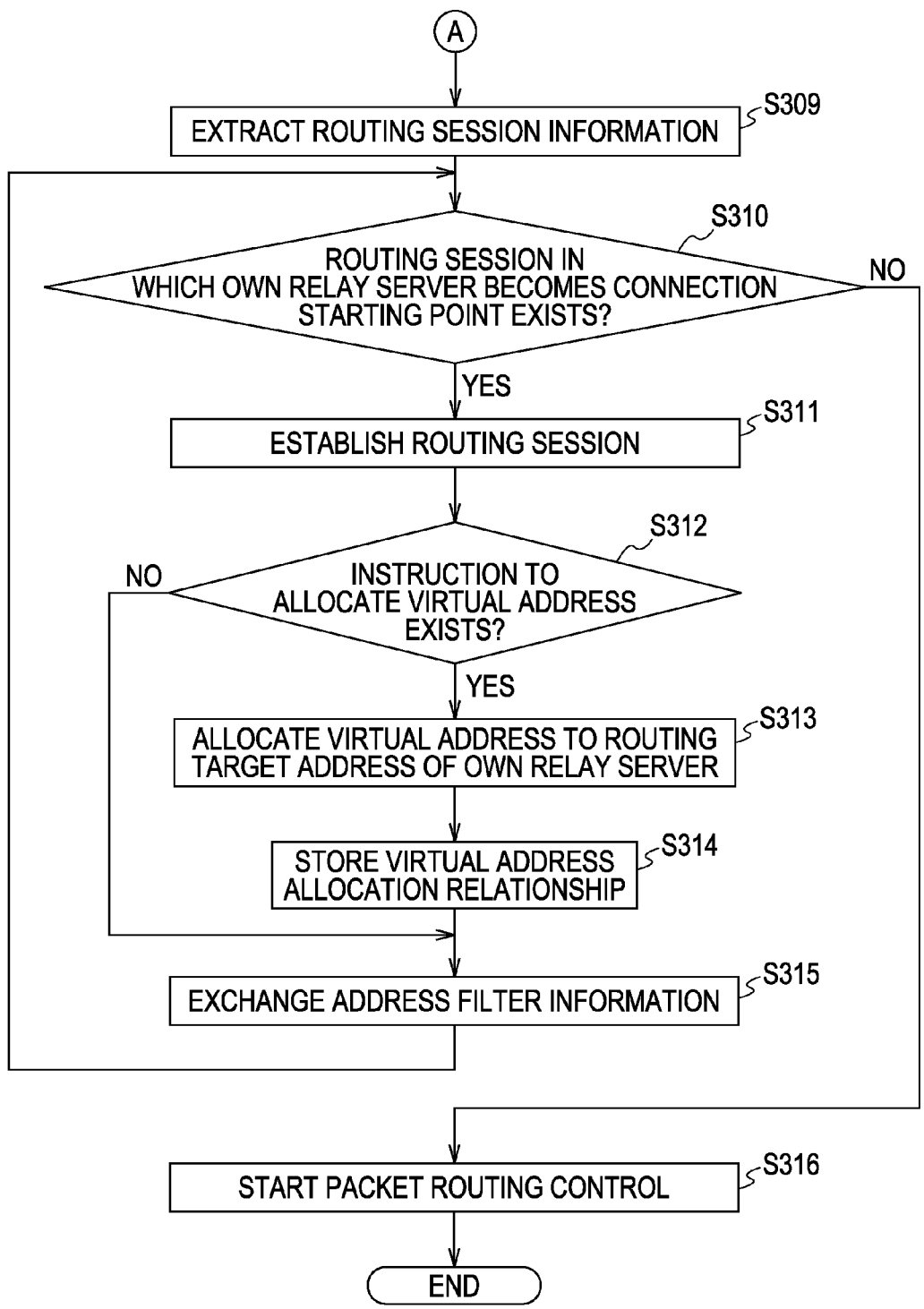
FIG. 13 is a flowchart illustrating processing of constructing the VPN.

A flow until the communication in which the VPN is used is started in the constructed VPN group will be described with reference to FIGS. 12 and 13. FIGS. 12 and 13 illustrate a flowchart illustrating processing, which is performed until the communication in which the VPN is used is started.

The user can display the constructed VPN groups on the screen by operating the client terminal 13 or the operating PC 11. The appropriate VPN group is selected from the displayed VPN groups (S301) to enable the processing of constructing the VPN. In this description, there will be described an example in which the relay server 3 performs processing of starting the produced VPN group (the VPN group constructed by the relay servers 1 and 3).

First, the relay server 3 reads the address filter information correlated with the relay server 3 (S302). The information read herein is the content (the content illustrated in FIG. 7C) registered in S101. The relay server 3 reads the routing point belonging to the selected VPN group (S303). Accordingly, the relay server 1 is read based on the content of the VPN group information illustrated in FIG. 6.

The relay server 3 determines whether the relay server 1 is currently logged into the relay communication system 100 (whether "stat" is active or blank) based on the relay server information (S304). According to the relay server information in FIG. 4, the relay server is currently logged into the relay communication system 100. Therefore, the relay server 3 transmits a command to start the VPN group to the relay server 1 together with the identification information on the VPN group (S305).

When receiving a response to the starting command from the relay server 1 (S306), the relay server 3 registers the relay server 1 as the routing point in which the preparation for the construction of the VPN is completed (S307).

Next, the relay server 3 determines whether another device belonging to the same VPN group exists (S308). Since the currently-produced VPN group includes only the relay servers 1 and 3, another device does not exist. If another device exists, the relay server 3 performs the pieces of processing in S304 to S307 to another device.

Next, the relay server 3 extracts the routing session information from the VPN group information storage unit 54 (S309 in FIG. 13). The relay server 3 refers to the extracted routing session information to determine whether the routing session in which the relay server 3 becomes the starting point is described (S310). The routing session information in FIG. 6 describes that the relay server 3 becomes the starting point in the routing session that should be established between the relay server 1 and the relay server 3. Therefore, the relay server 3 performs predetermined communication control to the relay server 1 to establish the routing session (S311).

Next, the relay server 3 determines whether the permission of the allocation of the virtual address is registered in S102 (S312). When the permission of the allocation of the virtual address is registered, the relay server 3 allocates the virtual address to the first routing target address of the relay server 3 (S313). In the present preferred embodiment, a virtual address that is randomly determined using a random table is allocated to the first routing target address (see FIG. 8B). In this manner, the first routing target address is prevented from being determined from the virtual address, and the security can be improved.

Next, the relay server 3 stores the correspondence relationship (allocation relationship) between the first routing target address and the virtual address allocated to the first routing target address in the virtual address allocation relationship storage unit 57 (S314).

Thereafter, the relay server 3 exchanges address filter information with the relay server 1 (S315). Specifically, the relay server 3 transmits to the relay server 1 the names of the target terminals 31, 32, and 33 and the virtual address allocated to the first routing target address. However, the relay server 3 does not transmit the first routing target address (actual address). On the other hand, since the relay server 1 does not conduct the communication in which the virtual address is used, the relay server 1 transmits to the relay server 3 the names of the operating PCs 11 and 12 and the second routing target address (actual address).

Thus, the content illustrated in FIG. 8B is stored in the relay server 3 while the content illustrated in FIG. 8A is stored in the relay server 1. As illustrated in FIG. 8A, not the actual addresses of the target terminals 31, 32, and 33 but the virtual addresses of the target terminals 31, 32, and 33 are registered in the relay server 1. The relay server 3 does not notify the relay server 1 whether the transmitted addresses related to the target terminals 31, 32, and 33 are the virtual addresses. Therefore, the user belonging to the LAN 10 cannot determine whether the actual addresses or the virtual addresses of the target terminals 31, 32, and 33 are registered in the relay server 1. Accordingly, the security can effectively be improved.

Next, the relay server 3 performs the processing in S310 again. Since the currently-produced VPN group only includes the relay servers 1 and 3, another routing session is not described in the VPN group information. Accordingly, the relay server 3 starts the packet routing control (S316). If another routing session exists, the relay server 3 performs the pieces of processing in S311 to S315 again.

As described above, in the present preferred embodiment, since the routing devices exchange the address filter information with each other (acquire the address filter information from each other) in constructing the VPN, the VPN can be constructed using the latest address filter information. Therefore, even if the address filter information is changed in some routing devices before the start of the VPN, the VPN is constructed while the change is reflected in all the routing devices, and the communication is started. Therefore, generation of a contradiction can be prevented in the packet routing, and reliability can be improved.

Although not illustrated in the flowchart in FIG. 13, even if the routing session in which the relay server 3 becomes the starting point does not exist in S310 (in the case where the relay server 3 becomes an ending point of the routing), the processing of establishing the routing session and the exchange of the address filter information are performed under the communication control of the routing device that becomes the starting point. At the same time, the virtual address is allocated in the case where the communication in which the virtual address is used is conducted.

Each routing device does not perform the initial communication control to establish the routing session unless the description in which the particular routing device is the starting point exists in the routing session information. Therefore, collision of the communication control can be prevented, and the routing session between the devices can be established by the simple control.

Next, processing of performing the packet routing using the established routing session will be described.

Figure 14:
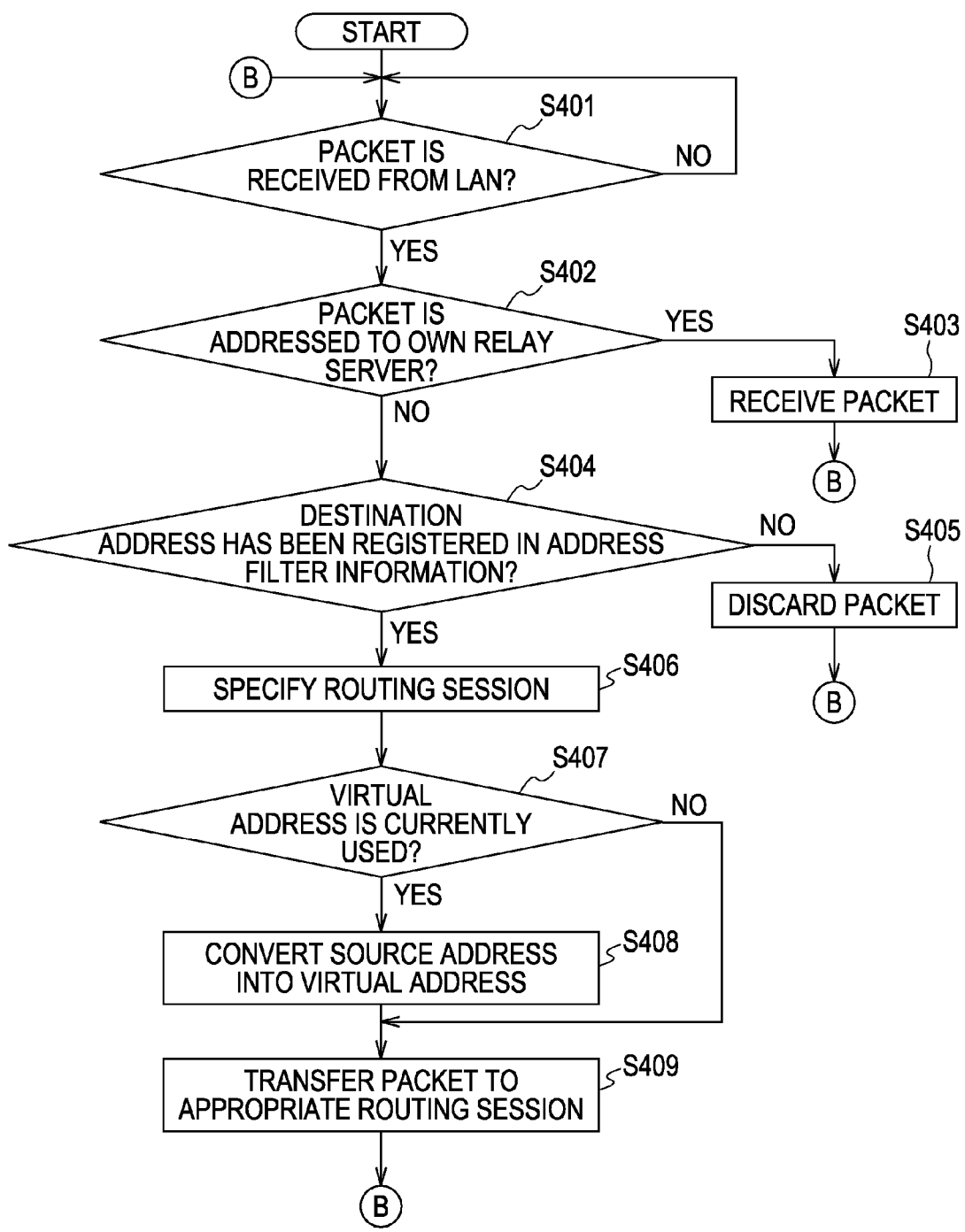
FIG. 14 is a flowchart illustrating routing control when a packet is received from a LAN.

First, control that is performed by the relay server 3 when the relay server 3 receives the packet from the LAN 30 will be described with reference to FIG. 14. FIG. 14 is a flowchart illustrating the flow of the control.

When transmitting the packet to another routing target device, the routing target device in the LAN 30 acquires another routing target address by referring to the information registered in the relay server 3, and transmits the packet while setting the acquired routing target address to the destination address.

The relay server 3 is in a waiting state until the relay server 3 receives the packet from the LAN 30 (S401). When receiving the packet from the LAN 30, the relay server 3 first determines whether the destination of the packet is the relay server 3 (S402).

When the destination of the packet is the relay server 3, the relay server 3 receives the packet (S403). On the other hand, when the destination of the packet is not the relay server 3, the relay server 3 compares the destination address of the received packet to the address filter information (see FIG. 8B) to determine whether the destination address is registered in the address filter information (S404). When the destination address is not registered in the address filter information, the relay server 3 discards the packet (S405). On the other hand, when the destination address is registered in the address filter information, the relay server 3 specifies the routing session corresponding to the address filter information (S406).

Next, the relay server 3 determines whether the relay server 3 uses the virtual address (whether the allocation of the virtual address is permitted in S102) (S407). When the relay server 3 uses the virtual address, the relay server 3 refers to the virtual address allocation relationship storage unit 57 to convert the source address into the virtual address (S408). The relay server 3 then transfers the packet to the routing session specified in S406 (S409). When the relay server 3 does not use the virtual address, the relay server 3 does not perform the conversion of the source address, but transmits (transfers) the packet to the routing session specified in S406 (S409).

Figure 15:
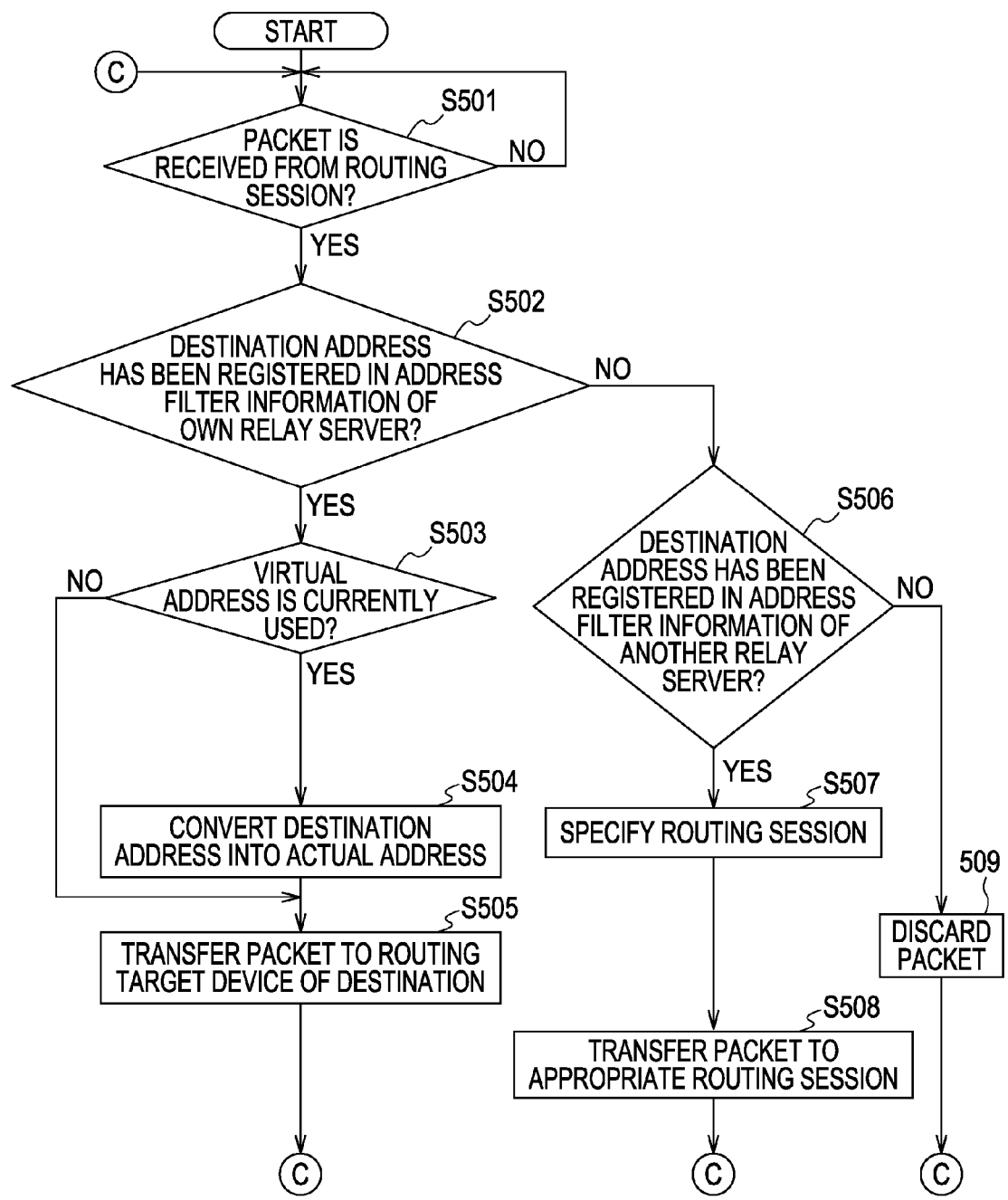
FIG. 15 is a flowchart illustrating routing control when the packet is received from a routing session.

Next, control that is performed by the relay server 3 when the relay server 3 receives the packet from the routing session will be described with reference to FIG. 15. FIG. 15 is a flowchart illustrating a flow of the control.

The relay server 3 is in the waiting state until the relay server 3 receives the packet from the routing session (S501). When receiving the packet from the routing session, the relay server 3 compares the destination address of the packet and the address filter information (see FIG. 8B) to determine whether the destination address of the packet is registered while correlated with the address filter information on the relay server 3 (S502).

When the destination address of the packet is registered while correlated with the address filter information on the relay server 3, the relay server 3 determines whether the relay server 3 currently uses the virtual address (whether the allocation of the virtual address is permitted in S102) (S503). When the relay server 3 currently uses the virtual address, the relay server 3 converts the destination address into the actual address (S504), and transfers the packet to the device (the target terminals 31, 32, and 33) indicated by the destination address (S505). When the relay server 3 does not currently use the virtual address, the relay server 3 transmits (transfers) the packet to the device indicated by the destination without converting the destination address (S505).

When the destination address is not registered while correlated with the address filter information on the relay server 3, the relay server 3 determines whether the destination address is registered while correlated with the address filter information on another routing device (S506). When the destination address is registered while correlated with the address filter information on another routing device, the relay server 3 specifies the corresponding routing session (S507), and transmits (transfers) the packet to this routing session (S508).

On the other hand, when the destination address is not registered in the address filter information on another routing device, the relay server 3 discards the packet (S509).

According to the above control process, the relay server 3 can conduct the communication using the virtual address.

Next, a flow, in which the operating PC 11 and the target terminal 31 exchange the packet with each other through the relay servers 1 and 3 that perform the above control, will be briefly described with reference to FIGS. 16A and 16B.

FIG. 16A illustrates the case where the packet is transmitted from the target terminal 31 to the operating PC 11. In this case, the relay server 3 performs the control illustrated in FIG. 14 in order to receive the packet from the LAN 30.

The target terminal 31 transmits the packet while setting the actual address of the operating PC 11 to the destination address. Based on the address filter information (see FIG. 8B), the relay server 3 that received the packet recognizes that the relay server 1 is described as the routing device corresponding to the destination address of the packet, and specifies the routing session (S406). Next, the relay server 3 recognizes that the relay server 3 currently uses the virtual address, and converts the source address into the virtual address (S408). The relay server 3 transmits the packet to the relay server 1 through the routing session (S409).

Based on the address filter information (see FIG. 8A), the relay server 1 that received the packet recognizes that the relay server 1 is described as the routing device corresponding to the destination address of the packet. The relay server 1 then transmits the packet to the destination operating PC 11.

FIG. 16B illustrates the case where the packet is transmitted from the operating PC 11 to the target terminal 31. In this case, the relay server 3 performs the control illustrated in FIG. 15 in order to receive the packet from the routing session.

The operating PC 11 acquires the virtual address of the target terminal 31 by receiving the packet from the target terminal 31 or by referring to the information registered in the relay server 1. The operating PC 11 transmits the packet while setting the virtual address to the destination. Based on the address filter information (see FIG. 8A), the relay server 1 that received the packet recognizes that the relay server 3 is described as the routing device corresponding to the destination address of the packet. The relay server 1 then transmits the packet to the relay server 3 through the routing session.

Based on the address filter information (see FIG. 8B), the relay server 3 that received the packet recognizes that the relay server 3 is described as the routing device corresponding to the destination address of the packet. Next, the relay server 3 recognizes that the relay server 3 currently uses the virtual address, and converts the destination address into the actual address (S504). The relay server 3 then transmits the packet to the destination target terminal 31 (S505).

Accordingly, the communication can be conducted between routing target devices without notifying the devices (such as the relay server 1 and the operating PCs 11 and 12) on the second LAN side of the first routing target address.

As described above, the relay server 3 of the present preferred embodiment preferably includes the address filter information storage unit 55, the virtual address allocation relationship storage unit 57, the virtual address setting information storage unit 58, and the controller 60. The address filter information storage unit 55 stores the addresses indicating the target terminals 31, 32, and 33 belonging to the same LAN 30 as the relay server 3 and the addresses indicating the operating PCs 11 and 12 belonging to the same LAN 10 as the relay server 1. The virtual address allocation relationship storage unit 57 stores the actual addresses of the target terminals 31, 32, and 33 belonging to the LAN 30 and the virtual address allocated to the addresses while correlated with each other. The virtual address setting information storage unit 58 stores with respect to each relay server whether the communication is conducted using the virtual address or the communication is conducted using the first routing target address. The controller 60 is programmed to allocate the virtual addresses to the actual addresses of the target terminals 31, 32, and 33 belonging to the LAN 30 to store the allocation relationship between the virtual address and the actual address in the virtual address allocation relationship storage unit 57. The controller 60 is programmed to perform control to store with respect to each relay server whether the communication is conducted using the virtual address or the first routing target address in virtual address setting information storage unit 58. The controller 60 is programmed to transmit the virtual addresses allocated to the actual addresses of the target terminals 31, 32, and 33 belonging to the LAN 30 to the relay server 1, and receive the addresses indicating the operating PCs 11 and 12 belonging to the LAN 10 from the relay server 1 to establish the routing session with the relay server 1. When receiving the packet having a destination of the virtual address from the routing session, the controller 60 is programmed to convert the destination address of the packet into the addresses of the target terminals 31, 32, and 33 belonging to the LAN 30 to transfer the packet to the destination target terminals 31, 32, and 33. When receiving the packets from the target terminals 31, 32, and 33 belonging to the LAN 30, the controller 60 is programmed to convert the source address of the packet into the virtual address to transfer the packet to the routing session.

Therefore, for example, by using one of the target terminals 31, 32, and 33, the user belonging to the LAN 30 can conduct the communication with the operating PCs 11 and 12 without notifying the actual address of the terminal to the other side. Accordingly, the relay communication can be conducted while the security is ensured. When viewed from the relay server 1 and the operating PCs 11 and 12, whether the address (for example, 150.100.0.82), of which the relay server 1 is notified in order to indicate the target terminals 31, 32, and 33 on the side of the LAN 30, is the actual address or the virtual address is concealed, so that the security can also be improved from this point.

In the relay server 3 of the present preferred embodiment, the controller 60 preferably is programmed to allocate a randomly-determined virtual address to the actual addresses of the target terminals 31, 32, and 33 belonging to the LAN 30.

Therefore, since the user on the side of the LAN 10 cannot determine the actual addresses of the target terminals 31, 32, and 33 from the virtual address, the security can further be improved.

As illustrated in FIG. 17, the controller 60 can set whether the allocation of the virtual address set in the above preferred embodiments is permitted with respect to each relay server.

For example, the setting can be determined based on the installation site of the relay server. For example, in the configuration in FIG. 1, it is assumed that the company in which the relay server 3 is installed differs from the company in which the relay server 1 is installed while the company in which the relay server 3 is installed preferably is identical to the company in which the relay server 2 is installed. In this case, there is a possibility that the transmission of the actual addresses of the target terminals 31, 32, and 33 to the relay server 1 cause a problem from the viewpoint of security. On the other hand, it is often the case that no problem is caused from the viewpoint of security even if the actual addresses of the target terminals 31, 32, and 33 are transmitted to the relay server 2. In this case, as illustrated in FIG. 17, the virtual address of the relay server 3 is assigned as the address transmitted to the relay server 1, and the actual address of the relay server 3 is assigned as the address transmitted to the relay server 2. Therefore, the VPN corresponding to the above situation can be constructed.

Although the preferred embodiments of the present invention have been described above, for example, the above configuration can be changed as follows.

Whether the communication in which the virtual address is used is permitted may be set during the initial settings of the VPN as in the above preferred embodiments or may be set during the start-up of the VPN.

There is no limitation to the timing in which the virtual address is allocated, and the timing is not limited to the above-described example. For example, the virtual address is allocated after the routing target address is received from another relay server, which can prevent the overlap with another routing target address.

In the above preferred embodiments, the address filter information preferably is exchanged at substantially the same time as the establishment of the routing session. Alternatively, the address filter information may be transmitted at the same time as the transmission of the command to start the VPN group (S305), and the address filter information may be received at the same time as the response (S306).

In the above preferred embodiments, each of the devices, such as the operating PC 11, preferably is the routing target device. Alternatively, for example, the whole LAN 10 (200.1.40.0/24) may be set to the routing target device of the relay server 1. In this case, the virtual address in which a range is assigned, for example, (150.100.10.0/24) is allocated to the routing target device.

There is no limitation to the timing in which the virtual address is allocated. For example, the address filter information may be transmitted at the same time as the transmission of the starting command. In this case, the virtual address can be allocated in the earlier timing.

In the above preferred embodiments, it is preferred that only the relay server acts as the routing point. Alternatively, the client terminal may act as the routing point. The number of routing points in the VPN group is not limited to two, but three or more routing points may be provided. Alternatively, one routing device may belong to a plurality of VPN groups.

The format for storing the relay group information, the relay server information, the client terminal information, the VPN group information, and the address filter information or the like described above is not limited to the XML format, but the pieces of information may be stored in an appropriate format.

Instead of the configuration of the above preferred embodiments, an external server preferably used to communicate between the relay servers may be installed on the Internet, and the external server may function as an SIP (Session Initiation Protocol) server to conduct the communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A relay server comprising:
an address filter information storage unit that stores a first routing target address and a second routing target address, the first routing target address being an address of a first routing target device, to which a packet is transferred, located in a first LAN, the second routing target address being an address of a second routing target device to which a second relay server located in a second LAN transfers a packet;
a virtual address allocation relationship storage unit that stores the first routing target address and a virtual address allocated and correlated to the first routing target address;
a virtual address setting information storage unit that stores whether communication with the second relay server is conducted using the virtual address or the first routing target address; and
a controller that is programmed to perform:
control to store in the virtual address setting information storage unit whether communication with the second relay server is conducted using the virtual address or the first routing target address;
control to allocate the virtual address to the first routing target address and store an allocation relationship between the virtual address and the first routing target address in the virtual address allocation relationship storage unit when the virtual address setting information storage unit stores that communication with the second relay server is conducted using the virtual address;
control to set with respect to the second relay server whether the communication is conducted using the virtual address or the first routing target address;
control to transmit the virtual address allocated to the first routing target address to the second relay server and receive the second routing target address from the second relay server, to establish a routing session with the second relay server;
control to refer to the virtual address allocation relationship storage unit when receiving a packet having a destination of the virtual address from the routing session and convert the destination address of the packet into the first routing target address corresponding to the virtual address, to transfer the packet to the first routing target device of the destination; and
control to refer to the virtual address allocation relationship storage unit when receiving a packet having a destination of the second routing target device from the first routing target device and convert a source address of the packet into the virtual address allocated to the first routing target address, to transfer the packet to the routing session.

2. The relay server according to claim 1, wherein the controller is programmed to allocate a randomly-determined virtual address to the first routing target address.

3. A relay communication system comprising:
a first relay server located in a first LAN; and
a second relay server located in a second LAN; wherein
the first relay server includes:
an address filter information storage unit that stores a first routing target address and a second routing target address, the first routing target address being an address of a first routing target device to which the first relay server transfers a packet, the second routing target address being an address of a second routing target device to which the second relay server located in the second LAN transfers the packet;
a virtual address allocation relationship storage unit that stores the first routing target address and a virtual address allocated and correlated to the first routing target address;
a virtual address setting information storage unit that stores whether communication with the second relay server is conducted using the virtual address or the first routing target address; and
a controller that is programmed to perform:
control to store in the virtual address setting information storage unit whether communication with the second relay server is conducted using the virtual address or the first routing target address;

control to allocate the virtual address to the first routing target address, to store an allocation relationship between the virtual address and the first routing target address in the virtual address allocation relationship storage unit when the virtual address setting information storage unit stores that communication with the second relay server is conducted using the virtual address;

control to set with respect to the second relay server whether the communication is conducted using the virtual address or the first routing target address;

control to transmit the virtual address allocated to the first routing target address to the second relay server and receive the second routing target address from the second relay server, to establish a routing session with the second relay server;

control to refer to the virtual address allocation relationship storage unit when receiving a packet having a destination of the virtual address from the routing session and convert the destination address of the packet into the first routing target address corresponding to the virtual address, to transfer the packet to the first routing target device of the destination; and control to refer to the virtual address allocation relationship storage unit when receiving a packet having a destination of the second routing target device from the first routing target device and convert a source address of the packet into the virtual address allocated to the first routing target address, to transfer the packet to the routing session.

* * * * *